United States Patent [19]
Enami et al.

[11] Patent Number: 5,458,077
[45] Date of Patent: Oct. 17, 1995

[54] MARINE FENDERS

[75] Inventors: Yasushi Enami, Chigasaki; Shinichi Kajigaya, Yokosuka; Masahiro Nakamura, Yokohama, all of Japan

[73] Assignee: Bridgestone Corporation, Tokyo, Japan

[21] Appl. No.: 218,176

[22] Filed: Mar. 28, 1994

[30] Foreign Application Priority Data

Mar. 29, 1993 [JP] Japan .................................. 5-095220
Feb. 18, 1994 [JP] Japan .................................. 6-045170

[51] Int. Cl.⁶ .................................................. B63B 59/02
[52] U.S. Cl. .................................................. 114/219
[58] Field of Search ........................... 114/219; 405/212, 405/215; 267/140; 14/76

[56] References Cited

U.S. PATENT DOCUMENTS 3,779,536 12/1973 Lachmann .............................. 267/140
3,948,500 4/1976 Korbuly et al. ........................ 267/140
4,258,641 3/1981 Wakamiya .............................. 405/215
4,355,792 10/1982 Fukuda et al. ......................... 405/215

FOREIGN PATENT DOCUMENTS 0055111 3/1985 Japan .................................... 405/215

Primary Examiner—Edwin L. Swinehart
Attorney, Agent, or Firm—Sughrue, Mion, Zinn, Macpeak & Seas

[57] ABSTRACT

A rubbery buckling-type marine fender such as cell-type hollow cylindrical marine fender, frustoconical-type hollow cylindrical marine fender, V-shaped marine fender or the like comprises a main rubber body portion, a securing flange portion, and a shock receiving portion, in which a rubber thickened region is formed in the inner peripheral surface of the main rubber body portion at a given position adjacent or close to a buckling point to prevent falling of reaction force during the buckling deformation.

3 Claims, 6 Drawing Sheets

FIG_1
PRIOR ART
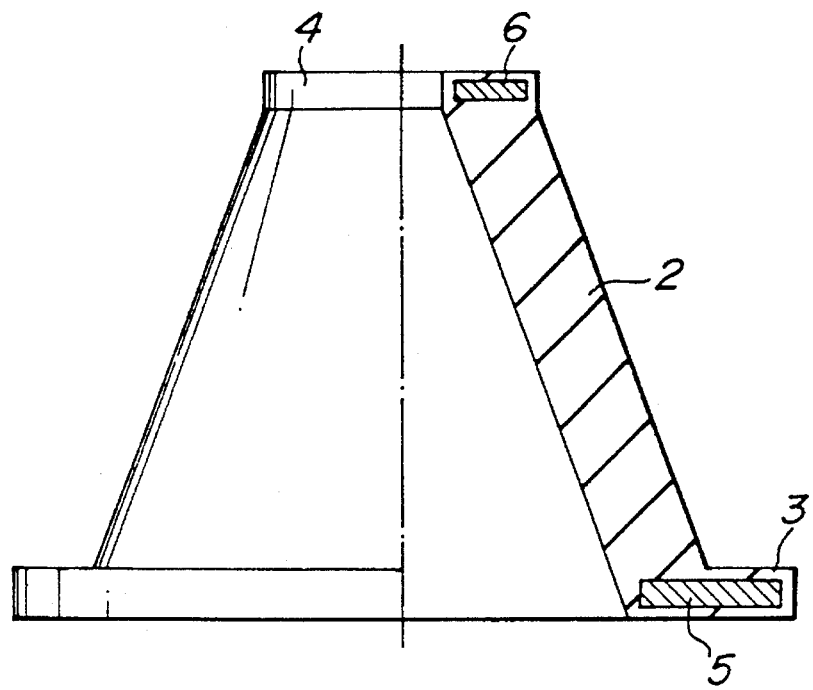
FIG_2
PRIOR ART
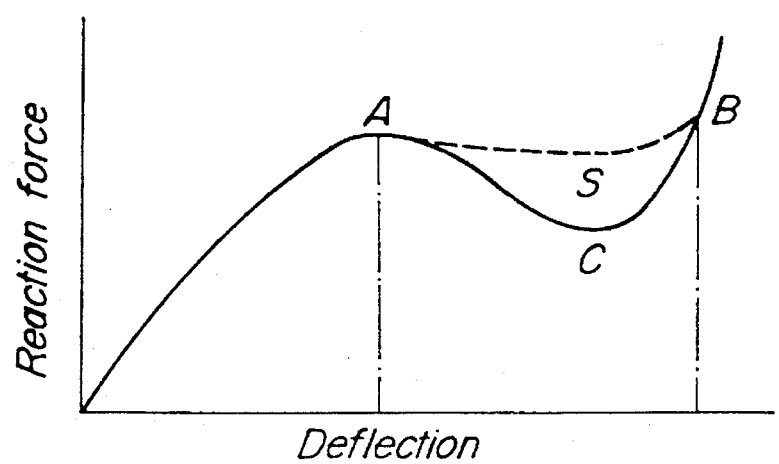

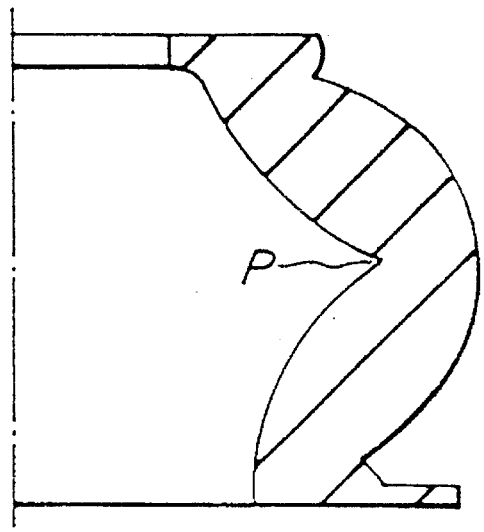
FIG_3a
PRIOR ART
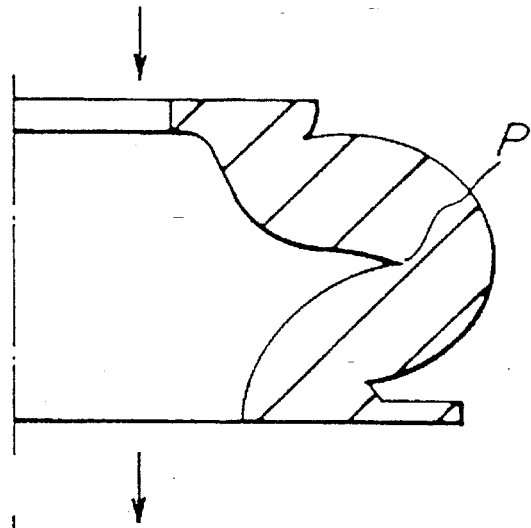
FIG_3b
PRIOR ART
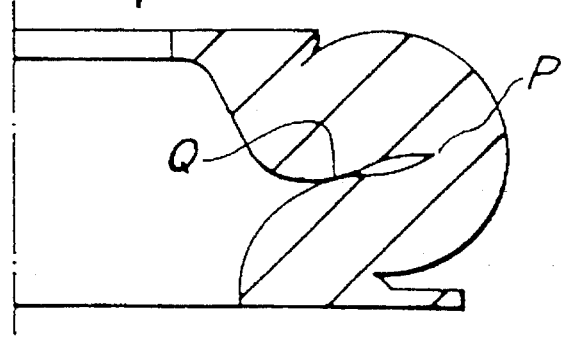
FIG_3c
PRIOR ART

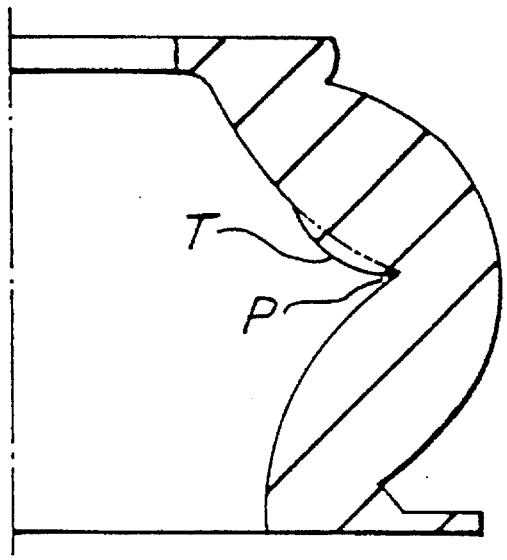
FIG_4a
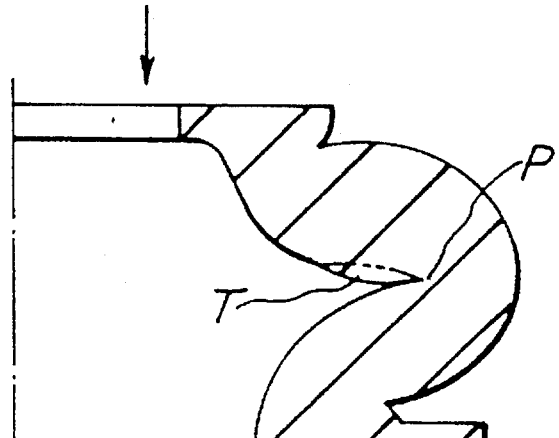
FIG_4b
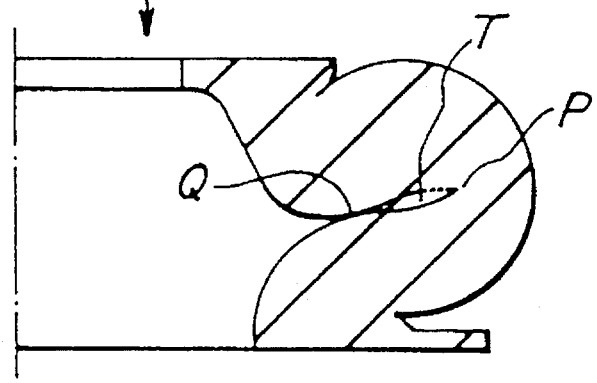
FIG_4c

FIG_5
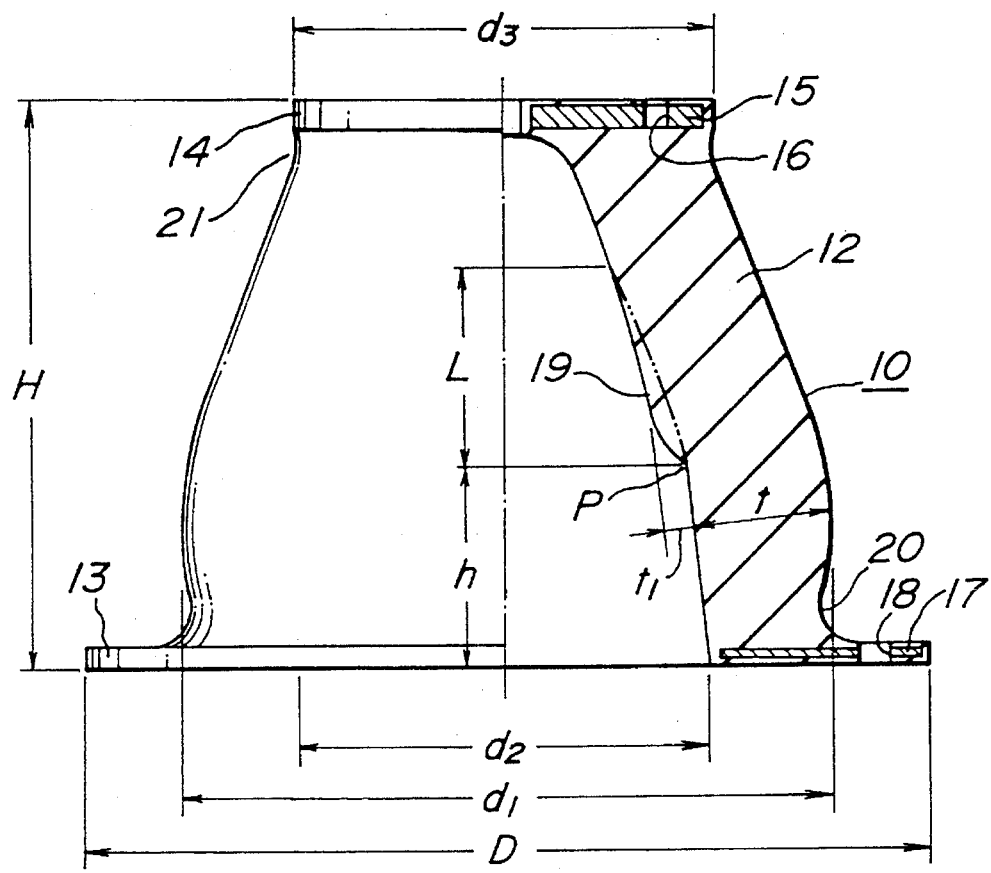
FIG_6
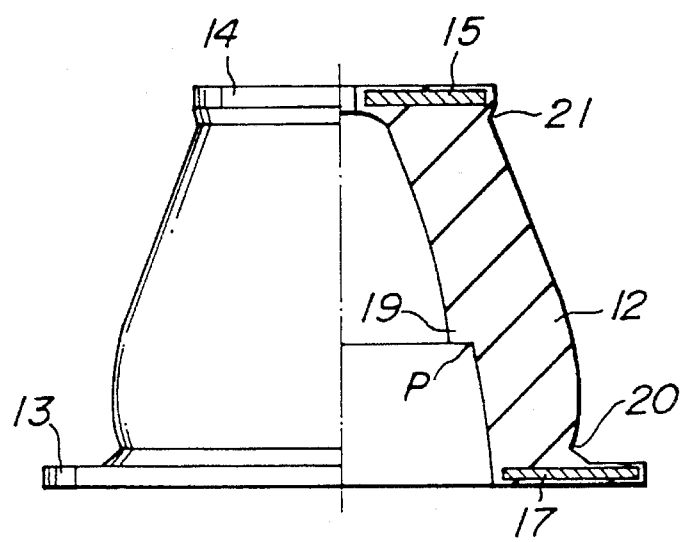

FIG_7
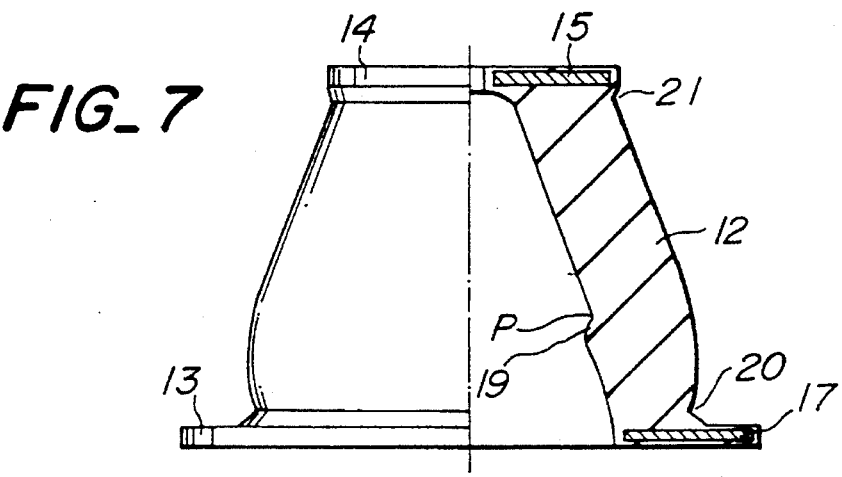
FIG_8
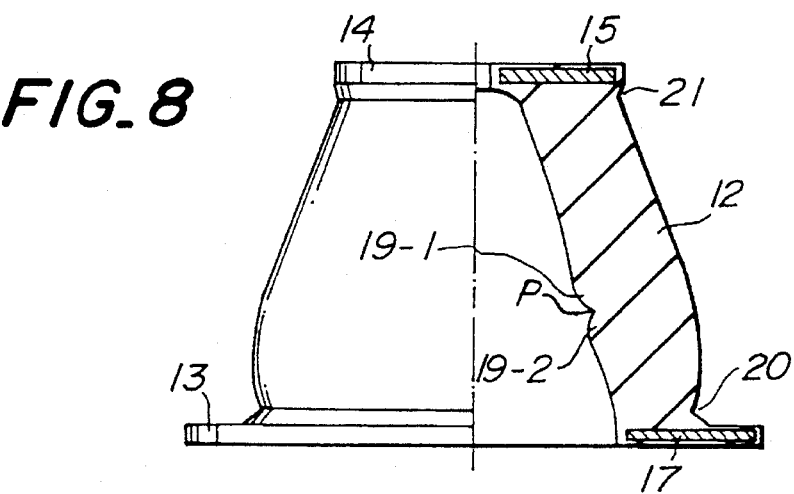
FIG_9
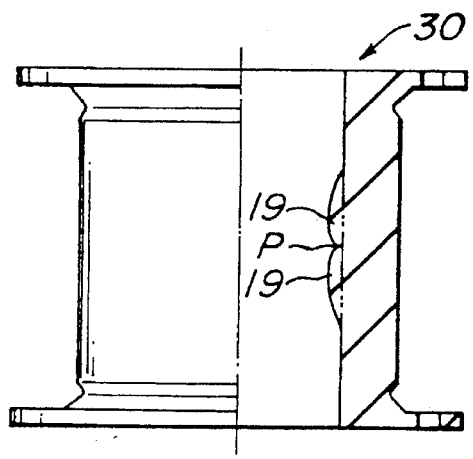

FIG_10
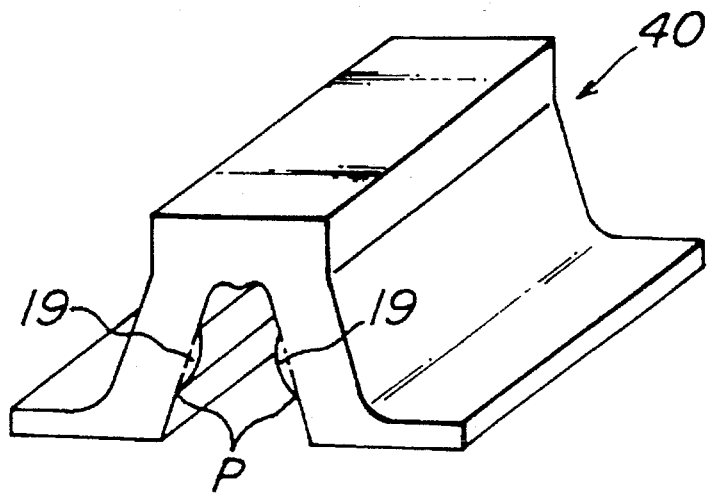
FIG_11
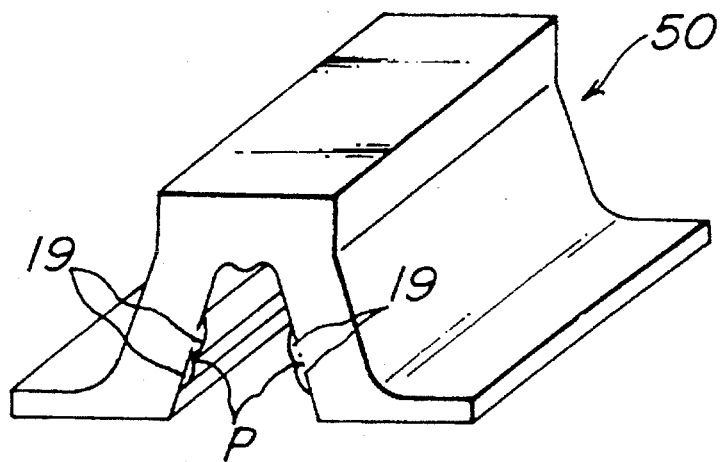

MARINE FENDERS

BACKGROUND OF THE INVENTION

1. Field of the Invention

This invention relates to a marine fender and more particularly, to an improvement of a rubbery buckling-type marine fender such as a hollow cylindrical marine fender, V-shaped marine fender, frustoconical marine fender or the like causing a buckling phenomenon in compression deformation.

2. Description of the Related Art

As an example of the conventional buckling-type marine fender, there is a rubbery hollow cylindrical marine fender of a conical trapezoidal form as shown in FIG. 1. .This marine fender comprises a main cylindrical rubber portion 2, a securing flange portion 3 for a quay wall, a shock receiving portion 4 and reinforcing steel plates 5, 6 embedded in the portions 3, 4. When such a marine fender is compressed in its axial direction by berthing of a vessel or the like thereto, there is obtained a deflection-reaction force curve absorbing a berthing energy as shown in FIG. 2. In this case, after the reaction force increases with the increase of the deflection to arrive at an upper peak (point A), it decreases to arrive at a point C though the deflection increases, and again rapidly increases with further increase of the deflection.

The marine fender exhibiting such a characteristic curve is actually used up to a point B showing the reaction force equal to the point A, in which the absorption energy of the marine fender is represented by an area surrounded by the deflection-reaction force curve and an abscissa up to the point B. However, the reaction force is actually decreased to the point C, so that the absorption energy is lost only by a portion S corresponding to an area surrounded by dotted line A-B and a curved line A-C-B. Therefore, it is required to raise the falling of reaction force represented by the point C to the dotted line A-B to increase the energy absorption by the area S.

Similarly, the above phenomenon is observed in V-shaped marine fender subjected to a berthing load in a direction perpendicular to the axial direction thereof.

In order to overcome the above problem of the conventional marine fender, there is proposed a hollow cylindrical marine fender in JP-Y-2-30505. This marine fender comprises a main cylindrical portion of a frustoconical form and a shock receiving portion of a cylindrical form, in which the loss of the absorption energy to be reduced by attempting specifying relationships between height of the main cylindrical portion and height of the shock receiving portion and between outer diameter of the shock receiving portion and inner diameter of a base of the main cylindrical portion.

According to this proposal, a timing of contacting an outer surface of the buckled main cylindrical portion with a hull of the berthing vessel is delayed by mainly making the height of the shock receiving portion relatively high, whereby the energy absorbing quantity is increased. However, since the shock receiving portion becomes higher, the deformation is necessarily caused in the shock receiving portion to create the same falling of the reaction force as in FIG. 2, so that it is not preferred to use such a marine fender in view of energy efficiency.

SUMMARY OF THE INVENTION

It is, therefore, an object of the invention to provide a rubbery buckling-type marine fender capable of reducing the loss of the absorption energy as far as possible. Particularly, the invention is to provide a rubbery buckling-type marine fender capable for efficiently preventing the falling phenomenon of reaction force produced through the buckling deformation of the main rubber body portion of the conventional marine fender by rendering a region of the main rubber body portion adjacent or close to an inner buckling point thereof into a thickened region.

According to the invention, there is the provision of a rubbery buckling-type marine fender comprising a main rubber body portion, a securing flange portion, and a shock receiving portion, in which an inner peripheral surface of the main rubber body portion is expanded inward in a region adjacent or close to a buckling point produced by buckling deformation of the main rubber body portion at at least one side with respect to the buckling point to form a rubber thickened region.

BRIEF DESCRIPTION OF THE DRAWINGS

The invention will be described with reference to the accompanying drawings, wherein:

FIG. 1 is a front view partly shown in section of the conventional buckling-type marine fender;

FIG. 2 is a diagram illustrating a deflection reaction force curve of the conventional marine fender;

FIGS. 3a–3c is a diagrammatically sectional view illustrating various deformation behavior of the conventional hollow cylindrical marine fender;

FIGS. 4a–4c is a diagrammatically sectional view illustrating various deformation behavior of an embodiment of the rubbery buckling-type marine fender according to the invention;

FIG. 5 is a front view partly shown in section of a first embodiment of the rubbery buckling-type marine fender according to the invention;

FIGS. 6 to 8 are front views partly shown in section of modified embodiments of the marine fender shown in FIG. 5, respectively;

FIG. 9 is a front view partly shown in section of a second embodiments of the rubbery buckling-type marine fender according to the invention; and FIGS. 10 and 11 are perspective views of the other embodiments of the rubbery buckling-type marine fender according to the invention, respectively.

DESCRIPTION OF THE PREFERRED EMBODIMENTS

The invention is based on results of actually observing the buckling deformation of the buckling-type marine fender such as cylindrical marine fender or the like in detail.

In the conventional marine fender, as the deflection quantity increases from the point A to the point B as shown in FIG. 2, the buckling deformation of the main cylindrical portion proceeds as shown by arrow in FIG. 3, during which the reaction force becomes lower than the upper peak (point A). As illustrated in FIG. 3, the falling of the reaction force between the points A and B in FIG. 2 is caused in the course of the buckling deformation starting from a buckling point P as shown in FIG. 3. That is, the upper and lower inner peripheral surface regions of the main cylindrical rubber portion do not contact with each other with respect to the buckling point P at the first and second steps of FIG. 3, but both regions contact with each other at a point Q somewhat apart from the buckling point P in the third step of FIG. 3. However, an uncontacted space still remains between the points P and Q, which brings about the falling of the reaction force.

According to the invention, the inner peripheral surface of the main rubber body portion corresponding to the region between the points P and Q is expanded inward to form a rubber thickened region T for filling in the uncontacted space between the points P and Q as shown in FIG. 4. Consequently the contact compressed region of the main rubber body portion can positively be increased between the points P and Q of FIG. 4 to increase the reaction force between the points A and B of FIG. 2. In the marine fender according to the invention, therefore, when the buckling deformation proceeds as shown by arrow in FIG. 4, the inner peripheral surface regions of the main rubber body portion sandwiching the buckling point P gradually contact each other to enlarge the contact compression area and hence the falling of the reaction force between the points A and B can be compensated by the compression reaction force owing to the presence of the rubber thickened region.

In the rubbery buckling-type marine fender according to the invention, the buckling point P is always held at a given position by the rubber thickened region formed on the inner peripheral surface of the main rubber body portion. On the other hand, the buckling point P is not specified in the conventional marine fender, so that the position of the buckling point P scatters for each buckling deformation even in a number of products or the same product and hence the scattering of the reaction force is caused. As seen from this fact, the scattering of the reaction force can be reduced by the formation of the rubber thickened region according to the invention.

In a preferred embodiment of the invention, an annular groove is formed on an outer surface of the main rubber body portion at a given position, whereby the main rubber body portion can efficiently be buckled in view of energy to improve the durability of the marine fender and to always provide a given reaction force. That is, the annular groove is formed on the outer surface of the main rubber body portion at a position somewhat separated from a reinforcing steel plate embedded in the securing flange portion. As a result the buckling is caused in the annular groove, so that the concentration of stress in the steel plate can be prevented to prevent the peeling of the steel plate from the adhesion surface to rubber and the rubber breakage to thereby improve the durability.

The starting point of the rubber thickened region (i.e. position of the buckling point P) differs in accordance with inclination angle of the main rubber body portion, height of the shock receiving portion, position of the annular groove formed on the outer surface of the main rubber body portion and the like. Preferably it is within a range of h=0.2H–0.6H in which h is a position of the buckling point P measured from a base line of the marine fender and H is a height of the marine fender measured from the base line. Furthermore, a length L of the rubber thickened region is usually within a range of L<0.5H because when it is too long, the displacement amount becomes small and the increase of the reaction force is prematurely caused. Moreover, a thickness of the rubber thickened region may properly be selected in accordance with the size of the marine fender, length of the rubber thickened region, thickness of the main rubber body portion and the like.

In FIG. 5 is shown a first embodiment of the rubbery buckling-type marine fender according to the invention. This marine fender is a hollow cylindrical marine fender 10 of a frustoconical shape, which comprises a main rubber body portion 12, a securing flange portion 13 for a quay wall, and a shock receiving portion 14 for a vessel. To the shock receiving portion 14 is fixed a shock receiving plate (not shown) directly subjected to berthing of the vessel. Furthermore, the shock receiving portion 14 is reinforced with a steel plate 15 embedded therein, wherein an internal thread 16 is screwed in the steel plate 15, through which the shock receiving plate is secured to the shock receiving portion. On the other hand, the securing flange portion 13 is reinforced with a steel plate 17 embedded therein and also a bolt hole 18 is formed in the steel plate for fixing to a quay wall or the like through a bolt (not shown).

A point P located in the inner peripheral surface of the main rubber body portion 12 is a buckling point when a load is applied to the shock receiving plate during the berthing of the vessel. In the illustrated embodiment, when the height of the marine fender 10 is H as measured from the base line, the position h of the point P locates within a range of about 0.3H to 0.4H. The main rubber body portion 12 is largely bulged outward by starting from the buckling point P to cause the buckling, whereby the berthing load is absorbed.

In the marine fender 10, a rubber thickened region 19 is formed on an inner peripheral surface of the main rubber body portion 12 adjacent to the buckling point (at the side of the shock receiving portion in the illustrated embodiment).

The dimensions of the marine fender are naturally different in accordance with the size of the vessel to be berthed. In the illustrated embodiment, the height H of the marine fender 10 is 100 cm, and the main rubber body portion 12 has an outer diameter $d_1$ of 90 cm, an inner diameter $d_2$ of 60 cm and a diameter $d_3$ (corresponding to the diameter of the shock receiving portion 14) of 80 cm, while the diameter D of the securing flange portion 13 is 130 cm. The thickness t of the main rubber body portion 12 is about 15 cm. On the other hand, the position h of the buckling point P is about 40 cm, while the rubber thickened region 19 has a length L of 23 cm and a thickness $t_1$ of 3 cm.

When the marine fender 10 is deformed by receiving the berthing load of the vessel or the like to cause the buckling deformation from the buckling point P, since the rubber thickened region 19 is arranged in the vicinity of the buckling point P, the inner peripheral surface portions of the main rubber body portion sandwiching the buckling point P contact with each other as shown in FIG. 4 to produce an effective reaction force. That is, the marine fender 10 according to the invention is small in the decrease of the reaction force between the points A and B in the reaction force-deflection curve as shown in FIG. 2 because the reaction force changes in a substantially horizontal direction (broken line) between the points A and B, so that the loss of absorption energy can be prevented.

Moreover, the effect of increasing the absorption energy as mentioned above can sufficiently be developed when the marine fender satisfies conditions of $0.1H \leq t \leq 0.35H$, $0.01t \leq t_1 \leq 0.1H$ and $L \leq 0.4H$.

In the embodiment of FIG. 5, annular grooves 20 and 21 are formed in the outer peripheral surface of the main rubber body portion 12 in the vicinities of the securing flange portion 13 and the shock receiving portion 14, respectively. These annular grooves 20 and 21 have a certain curvature. These annular grooves 20 and 21 serve as buckling points of the main rubber body portion 12 to prevent the peeling of the steel plates 15 and 17 from the adhesion surface to rubber and the rubber breakage.

In the marine fender 10 of FIG. 5, the rubber thickened region 19 is formed at one side of the inner peripheral surface of the main rubber body portion with respect to the buckling point P. However, the rubber thickened region may be arranged at both sides sandwiching the buckling point P. Furthermore, the sectional shape of the rubber thickened region is not particularly restricted.

FIGS. 6 to 8 illustrate modified embodiments of the rubbery buckling-type marine fender shown in FIG. 5, respectively. In FIG. 6, the rubber thickened region 19 has a square shape at the position corresponding to the buckling point P. In FIG. 7, the rubber thickened region 19 is formed at a side of the securing flange portion 13 with respect to the buckling point P. In FIG. 8, the rubber thickened regions 19-1 and 19-2 are formed at both sides with respect to the buckling point P. In these embodiments, the annular grooves 20 and 21 are V-shaped in section.

FIGS. 9 to 11 illustrate other embodiments of the rubbery buckling-type marine fender according to the invention, respectively. The marine fender 30 of FIG. 9 is a cell-type marine fender comprising a main rubber body portion provided with two rubber thickened regions 19 sandwiching the buckling point P. The marine fender 40 of FIG. 10 is a V-shaped marine fender comprising a main rubber body portion provided with the rubber thickened region 19 at one side with respect to the buckling point P. The marine fender 50 of FIG. 11 is a V-shaped marine fender comprising a main rubber body portion provided with two rubber thickened regions 19 sandwiching the buckling point P.

As mentioned above, according to the invention, the uncontacted space formed between the buckling point P and the point Q in FIG. 3 is filled with the rubber thickened region formed in the inner peripheral surface of the main rubber body portion adjacent or close to the buckling point P. As a result rubbery buckling-type marine fenders developing an excellent absorption performance against berthing shock without falling of the reaction force in the deflection reaction force curve.

We claim:

1. A buckling rubber marine fender comprising;

a main rubber body portion, a securing flange portion, and a shock receiving portion, a buckling point produced by buckling deformation and casing outward deformation of the main rubber body portion at at least one side thereof a rubber thickened region formed on an inner peripheral surface of said main rubber body portion and extending from said buckling point but not overlapping it, a starting point h of the rubber thickened region corresponding to a position of the buckling point as measured from a base line of the marine fender within a range of 0.2H–0.6H, and a length L of the rubber thickened region less than 0.5H when H is a height of the marine fender as measured from the base line, wherein inner portions, including said rubber thickened region contact each other during buckling deformation.

2. The marine fender according to claim 1, wherein annular grooves are formed in an outer peripheral surface of the main rubber body portion in the vicinities of the securing flange portion and the shock receiving portion.

3. The marine fender according to claim 1, wherein when a height of the marine fender is H, a thickness of the main rubber body portion is t, and a length and a thickness of the rubber thickened region are L and $t_1$, the marine fender satisfies $0.1H \leq t \leq 0.35H$, $0.01t \leq t_1 \leq 0.1H$ and $L \leq 0.4H$.

* * * * *